United States Patent [19]

Kanics

[11] 4,162,795
[45] Jul. 31, 1979

[54] SEALING DEVICE FOR OPENINGS OF A CONTAINER WHICH CAN BE LOADED WITH AND EMPTIED OF BATCHES OF FLUID LOOSE MATERIAL, VISCOUS DEPOSITS, SLUDGES OR THE LIKE

[75] Inventor: Andras Kanics, Laasphe, Fed. Rep. of Germany

[73] Assignee: Mittelmann GmbH & Co. KG, Laasphe, Fed. Rep. of Germany

[21] Appl. No.: 862,616

[22] Filed: Dec. 20, 1977

[30] Foreign Application Priority Data

Dec. 20, 1976 [DE] Fed. Rep. of Germany ... 7639803[U]
Dec. 20, 1976 [DE] Fed. Rep. of Germany ... 7639879[U]

[51] Int. Cl.$^2$ ............................................. F16J 15/56
[52] U.S. Cl. ........................... 277/237 R; 137/630.19; 222/450; 251/DIG. 1
[58] Field of Search ............... 222/450, 426, 428; 137/630.19; 251/DIG. 1; 277/168, 102, 137 R

[56] References Cited

U.S. PATENT DOCUMENTS

| | | | |
|---|---|---|---|
| 2,659,568 | 11/1953 | Groue et al. | 251/DIG. 1 |
| 2,903,310 | 9/1959 | Hill | 277/102 |
| 3,058,498 | 10/1962 | Vogt | 222/428 |
| 3,474,630 | 10/1969 | Pogonowski | 277/237 |
| 3,998,686 | 12/1976 | Meiling et al. | 222/450 |

Primary Examiner—Robert I. Smith
Attorney, Agent, or Firm—Blanchard, Flynn, Thiel, Boutell & Tanis

[57] ABSTRACT

A sealing device for an opening in the wall of a container which is loaded with or emptied of fluid loose material, viscous deposits, sludges or the like and which after the loading or the emptying is sealed tightly and has a sealing element which is brought into sealing abutment to a sealing seat, secured to the wall, by means of its sealing surface. The sealing element has a sealing surface which is brought into linear sealing abutment with the sealing seat. Above this line of sealing abutment, a casing having a diameter smaller than that of the sealing abutment line is supported on the sealing surface of the sealing element during the first part of the opening operation and is free of engagement therewith in the following movement. A guide device is provided for the charge, by means of which it can be guided onto the area of the sealing element, which is enclosed by the casing, resting on the sealing surface of the sealing element to thereby protect the sealing seat from engagement with the material during the opening and closing movement of the sealing element.

43 Claims, 6 Drawing Figures

SEALING DEVICE FOR OPENINGS OF A CONTAINER WHICH CAN BE LOADED WITH AND EMPTIED OF BATCHES OF FLUID LOOSE MATERIAL, VISCOUS DEPOSITS, SLUDGES OR THE LIKE

FIELD OF THE INVENTION

The invention relates to a sealing device for an opening in the wall of a container which is to be loaded with or emptied of fluid loose material, viscous deposits, sludges or the like and which after the loading or the emptying is to be sealed tightly and has a sealing element which can be brought into sealing abutment to a sealing seat, secured to the wall, by means of its sealing surface.

BACKGROUND OF THE INVENTION

The loading or emptying of a container such as a reserve container, silo, bunker or an autoclave or an inlet unit of a pneumatic or hydraulic conveyor system, with a charge in the form of fluid loose material, viscous deposits, sludges or the like, presents special difficulties when such charge is still only to be placed in batches and the container is to be sealed tightly again between two insertions, this charge, however, having a great wear effect on the components belonging to the inlet opening and to the sealing device. It has become clear that particularly in the case of materials which already have a great wear effects in the cold state such as quartz sand, for example, unfavourable signs of wear usually appear on the components of the sealing device of the container, which take part with each other in the sealing effect, already after a relatively short period of operation, which signs of wear nullify a good sealing effect for the container and either force adjustment and readjustment operations on the sealing device or the exchange of the components of the device which take part with each other in the sealing effect. In the light of experience, however, the two measures require a not inconsiderable expenditure of time and work, quite apart from costs thereby occasioned not only for the provision with regard to the necessary amouring of parts subject to such a wear effect and the increased warehousing and operating costs for keeping and assembling spare parts but also in so doing a more aggravating disadvantage occurs which is to be considered the fact that for each such maintenance or exchange procedure the operation of the system to which the container belongs as a unit that is connected to the input or the output, must be interrupted, which in the overwhelming number of cases of use usually leads to considerable operational shutdowns.

These problems are aggravated more substantially if the charge not only shows a great wear effect which derives from its grain configuration and its hardness as well as its abrasive resistance, but has additionally or alternatively thereto an agressiveness which derives from its chemical properties or from its temperature at which it is passed through the inlet opening of the container. Such behavior results, for example, when the charge, for example, is hot plaster of Paris or a final or intermediate manufactured product of the chemical industry, particularly of the plastics industry. In such cases the components of the sealing device which apply the sealing action for the inlet opening of the container suffer not only from the mechanical wear due to abrasion but also due to caustic and corrosive effects of a chemical nature and the like on the one hand and on the other hand alteration phenomena because of high temperature stresses not only in constant operation but also frequently moreover temperature cyclic stresses.

And this unfavorable mechanical, chemical and temperature stress behavior have further as well an even more unproportionally unfavorable effect when the frequency of loadings which is to be made equal with the switching frequency of the sealing device for the inlet opening of the container, increases. This is predominantly the case when the container is operated as a storage unit for a hydraulic or pneumatic conveyor system for the charge in which it is vital that this charge after having been inserted in the container by the application of an increased pressure is to be further conveyed in a fluidized or an air pressure compressed state, which has as a precondition that one ensures that this pressure cannot leak out from the interior of the container. This however means the necessity of ensuring and maintaining a secure and reliably pressure-tight sealing of the inlet opening of the container. On the other hand problems of an identical kind, however, also occur when the container comes to be used not in conjunction with a hydraulic or pneumatic conveyor system but one only has to ensure that certain pressure ratios and/or conditions are maintained in its interior with respect to the composition of the container contents. This may, for example, be the case when a charge of the kind described is to be kept in the container under inert gas conditions and one has to prevent in a reliable manner gaseous or fluid media, which enter into a chemical reaction with the charge, from penetrating into the container interior as, for example, in the case of an inflammable charge, oxygen which leads to the ignition of the charge.

The problem that the inlet opening of a container must be sealed on the one hand tight with respect to the charge and on the other hand pressure-tight has already been recognized. For this solution a design of sealing device for an inlet opening or a pressure vessel, used as a feed unit for a pneumatic conveyor system, has also already become known in which the sealing of the inlet opening of the vessel takes place in two stages. In this design there projects into the inlet opening of the container annularly on all sides a rubber gasket having a trapezoid cross-section and two shear edges, one lying above the other as well as a sealing seat which is connected to the lower shear edge and broadens inward in the direction of discharge to the interior of the container in the fashion of a cone or of a truncated cone. A sealing element operates against this sealing ring which is contoured to a sharp edge from the interior of the container outwards and has a butting face for the charge, which has the shape of a truncated cone and is rounded off in its culmination area and continues in the lower area to a cylindrical step having a diameter which deviates slightly from the internal diameter of the sealing ring and then continues outwards and downwards to a sealing surface which has a truncated cone shape corresponding to the truncated cone-shaped sealing surface of the sealing ring and is brought to abut the opposing face of the sealing ring in an areal manner in the course of the sealing movement of the sealing element.

In this known device the upper shear edge of the sealing ring, which determines the shape of the charge column, following the movement of the sealing element, and the wall of this sealing area are subject to an increased wear. This results, already in the course of a relatively short operational period, in wear, which can neither be foreseen nor controlled, of the edges which are necessary for the sealing effect of the known device.

From fundamental considerations, which are confirmed by experience, in the case of this known device a pressure tightness can also, however, already not be achieved as before and is not at all to be ensured for longer operational periods. In fact it is unavoidable in this case that particles of the charge lodge between the corresponding conical sealing surfaces of the sealing element and the sealing ring and prevent a good and tight abutting of the surfaces on one another.

The object of the invention is to produce by simple and cheap means, avoiding the disadvantages of known methods, a possibility of loading the container with or emptying it of, through an opening in its top or bottom wall, fluid loose material, viscous deposits, sludges or the like, without taking into account physical or chemical properties of such a charge, as, for example, its particle configuration, distribution of grain size, hardness properties, degree of humidity, temperature, chemical aggresiveness and the like, in batches or also with a high batch frequency or high switching frequency of the sealing element sealing off the inlet opening of the container, and after loading or emptying of being able to seal it tightly again, in such a manner that not only a maximum low-wear sealing with respect to the charge is always reliably ensured but also a secure and lasting pressure sealing over long operational periods, whereby moreover this possibility should be effectively present even with containers containing an excess pressure with respect to the ambient pressure without additional and costly measures for remotely controlled pressure venting even if the container when its inlet opening is being fed, is to be loaded at substantial height and under normal pressure conditions without a charge column being stored above the opening.

The object is achieved in accordance with the invention in that the sealing element has a sealing surface which can be brought into linear sealing abutment with a sealing seat, secured to the wall, and in that above this line of sealing abutment a casing with a diameter smaller than that of the sealing abutment line is supported at rest on the sealing surface of the sealing element during the first part of the opening operation and is kept free in the following movement and in that a guide device is provided for the charge by means of which it can be guided onto the area of the sealing element, which is enclosed by the casing, resting on the sealing surface of the sealing element.

In the case of a device in accordance with the invention the column-shaped charge is fed from an upper height level, whilst maintaining its floor pressure surface support, past the lower height level of the sealing seat in such a manner that there is no possibility of coming into contact with it when the charge according to its angle of pouring or of flow is presented with the possibility of freely sliding down along the peripheral contours of the sealing surface of the sealing element. Thus the concept in accordance with the invention cannot lead to the undesirable disadvantages of known solutions, as in accordance with the invention the sealing off of the charge flow with respect to the sealing element is not only separated from the pressure sealing but it is ensured in accordance with the invention that any contact between the charge and the sealing seat intended for a satisfactory pressure sealing is excluded.

It is proposed in accordance that the sealing element is constructed in such a manner it constantly widens the free cross-section of passage for the charge during the course of its opening movement. Thus in fact by extremely simple and cheap means any bridge formation between the guide device and the sealing surface of the sealing element on the one hand and the floor pressure surface of the charge on the casing, limiting the sealing surface of the sealing element, and the sealing surface of the sealing element on the other hand is avoided.

The casing can, if required, be kept in abutment on the sealing surface of the sealing element, but it has, surprisingly, been shown that this is not at all necessary in many cases and it is moreover sufficient if the casing is kept at rest through the effect of gravitational forces, i.e. on the sealing surface of the sealing element. It has thereby proved particularly advantageous that the casing, in accordance with the invention, can be kept, during the opening movement of the sealing element, in abutment on the sealing surface of the sealing element due to the effect of friction on it of the charge contained between it and the sealing element.

An advantageous combination of the favorable starting and sliding effect for the charge of a conical construction of the sealing surface of the sealing element with the particularly favorable self-adjusting effect of a construction of the sealing face having the shape of a spherical segment, is achieved in accordance with another inventive development in that the sealing element has a sealing surface composed of a conical culmination area and an area, having the shape of a spherical segment, which is connected to it towards the outside and opposite which the casing is supported, and/or an area, having the shape of a spherical segment and connected outwards, which can be brought into sealing abutment with the sealing seat, secured to the top wall.

In accordance with the invention the casing is brought during the opening movement of the sealing element from a closing position, located above the sealing seat, to a protective position which overlaps the sealing seat on its inner side at a distance in the manner of a curtain. It is important that the discharged material slides freely past the sealing seat according to its angle of pouring or flow.

A particularly simple and cheap design is achieved in that in accordance with a further inventive development the casing for the raising and sinking movement is guided laterally on the top wall. In so doing the casing can preferably be guided during its movement which follows the raising and sinking movement of the sealing element with a degree of freedom for a tipping or tumbling movement with a slight angle of inclination to the direction of movement of the sealing element. The casing thus in fact obtains in accordance with the object to a greater extent the possibility of adjusting itself, independently of the nature of the charge stream, to the sealing surface of the sealing element, and of being able to adapt to it in such a manner that an optimal sealing effect with respect to the charge particles is always ensured. For this purpose the casing can, in a further advantageous development of the invention, have distributed at uniform angular distances radially about its outer surface guide ribs which project therefrom, whose front faces are guided along the inner wall of a socket, secured to the top wall, for axial movement. An embodiment which is to be preferred for both design as well as production reasons is thereby achieved when a movement equalization clearance is provided for the casing between the front faces of the guide ribs and the socket. Furthermore to further improve the sealing effect the casing can have in its lower peripheral area an inner diameter which widens outwards. Its expanded part can for this purpose can thus be constructed in the shape of a cone.

The self-adjusting action of the casing relative to the sealing surface of the sealing element is increased still further by simple and economical means in that the guide ribs are rounded off in their end at their end regions and moreover their leading edge area is tapered outwards. In addition the guide ribs are supported advantageously in order to limit the axial movement of the casing and thus to end the lateral guidance of the charge column which rests on the central area of the sealing surface of the sealing element as a floor pressure surface and to release the free sliding down of the column in that they are constructed as a stop cam which abuts on the stop surface of the top wall. This effect is further supported in that the end regions of the guide ribs are rounded off. In so doing any wear which could, in fact, occur due to the guide ribs striking the stop cams at the side of the top wall, is kept to a minimum, whereby moreover an impact height which always remains the same, remains ensured even if the casing should once adopt an equalization position which is tilted at a slight angle of inclination to the direction of movement of the sealing element.

In accordance with an inventive development the sealing element at least during its abutting of the sealing seat is kept with a degree of freedom for a tipping or tumbling movement about its axis of movement. This can be effected advantageously by a single-point suspension of the sealing element. In so doing the sealing element is left the possibility of adjusting itself optimally depending on the operational parameters relative to the casing, determining the effective flow surface for the charge and/or the sealing seat, cooperating with its sealing surface, in such a manner that with the least possible wear effect a tight abd reliable pressure sealing is always possible.

A further inventive idea is directed towards the exclusion of any bridge formation by the charge in a reliable manner. In accordance with this inventive idea a loosening pulse can be applied in accordance with the invention during the course of the opening movement of the sealing element after it lifts away from the sealing seat, to the accumulation of charge between the sealing element and the casing, resting on it, and/or to the sealing element and/or the wall area adjacent to the sealing seat. Both can be effected in an inventive development of this inventive idea in that the loosening pulse can be applied by an impact of a striking member, secured to the casing, on the wall area near to the sealing seat. For this purpose, when the sealing device in accordance with the invention has a casing, guided by way of radial guide ribs, for the limitation of the floor pressure area or the charge accumulation resting thereupon, the guide ribs, secured to the casing, can be called upon, in that the loosening pulse can be applied to their lower ends as striking members which strike a stop nose or rim disposed so as to be secured to the top wall.

In this manner by extremely simple and cheap means any kind whatsoever of bridge formation is also effectively excluded under unfavorable conditions and when the charges possesses properties which are difficult to overcome. Furthermore still during the course of the cycle of the method in accordance with the invention, any bridge formation is effectively prevented in that in fact the limiting or ending of the sinking movement of the casing is used in order to apply a loosening pulse automatically i.e. by the impact of the guide ribs, constructed as striking members, of the casing on a stop nose or rim on the top wall of the container to be loaded.

In accordance with a further proposal concerning the invention loosening pulses are also applied during the course of the closing movement of the sealing element.

It is basically immaterial to the invention how the cross-section of the sealing seat is constructed if one only ensures that the pressure sealing takes place by way of a linear contact between sealing surface of the sealing element and the sealing seat and not, as in the prior art, by means of the abutment of two corresponding sealing surfaces on each other. It has, however, proved to be particularly advantageous if the sealing seat is formed by a ring seal of an elastic material, which is kept in the inner front wall of the inlet opening. By this means a certain self-adjustment of both sealing elements which effect the pressure sealing is in fact reached. This can be even further increased in that the cross-section of this ring seal has, at least in the sealing area, a constant convex curved peripheral contour.

A further development of the invention has proved to be advantageous both from a design and production standpoint as well as with regard to ease of assembly, in accordance with which the sealing element is mounted at the end of a piston rod of a hydraulically or pneumatically actuatable cylinder which is kept in the interior of the container by way of spacer bolts which project into the container interior from the top wall. In so doing it is advantageous if at least two of the spacer bolts can be constructed as feed or discharge pipes for the hydraulic or pneumatic pressure means.

This concept in accordance with the invention offers for the first time the possibility, in inserting the charge in the container intended for its reception, of being able to dispense with additional devices for removing air from the container, which devices are otherwise required and in the majority of ceases are associated with not inconsiderable costs. Particularly when it is the case that the container, to be loaded, contains a gaseous filling medium, it is an economically important factor in the vast number of cases if there is a possibility of not simply blowing off this filling medium but of making it accessible for further use. For this purpose the basic concept in accordance offers the possibility during loading of discharging the air in the container, displaced by the charge. In the csse of a surprisingly simple and cheap inventive development which depends on this basic concept in accordance with the invention it is an essential feature that the displaced air of the container to be loaded can be discharged by means of the peripheral part of the inlet opening, not filled out by the incoming charge, between the sealing seat and the charge stream in counter-flow thereto. It can be recognized that by this means many technical advantages, which hitherto were unattainable, can be achieved.

In the prior art it is further completely impossible to insert a charge in a closed receiving chamber or a container, which is to be loaded, in whose interior prior to insertion of the charge the air is under excess pressure with respect to ambient pressure. Here the dual flow concept in accordance with the invention offers the possibility of effecting the necessary equalization of pressure while maintaining the other advantages achieved in accordance with the invention.

BRIEF DESCRIPTION OF THE DRAWINGS

An embodiment of the invention is described in greater detail hereinbelow with reference to the drawings which show.

DETAILED DESCRIPTION

Figure 1:
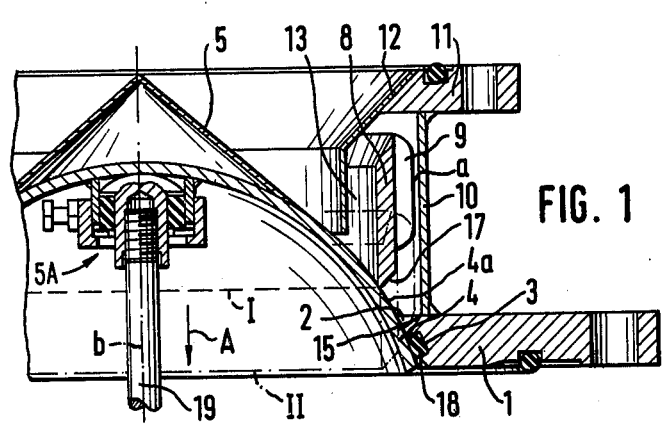
FIG. 1 a diagrammatic representation of an axial section through a sealing device in accordance with the invention.

In FIGS. 1 to 4, 1 or 101 designates a flange of a sealing device in accordance with the invention, which is bolted to the wall of a container which is to be loaded or emptied. In the embodiment shown, this component comprises a support flange which can be set into the actual wall of the container so as to be interchangeable and which carries the other components, secured to the wall, in an interchangeable manner. Thus an inlet opening is to be recognized in whose inner front face in an annular groove, recessed in known manner, a sealing ring 3, constructed as an O ring, is disposed. This flange forms the sealing seat for the sealing surface 4a, which is still to be described, of a sealing element 4, 5.

Above the sealing ring or seat 3, a hollow sleeve or socket 10 is fixed on the flange 1 of the container and supports by way of a support flange 11 a funnel 12 which serves as a guide device for the charge. In the chamber between the funnel 12 and the socket 10 a casing 8 is disposed which has an exterior diameter which is smaller than the narrowest diameter of the inlet opening 2 of the container, to be loaded, and all the more than the narrowest diameter of the sealing seat. The casing 8 is under the effect of its own weight freely moveable in the chamber 16 between the funnel 12 and the socket 10 so as to be able to move up and down and in fact from a high position I, serving as a closing position, to a low position II representing a protecting position for the sealing seat 3. The casing 8 is guided, with respect to a desired axial displacement which exceeds a preset permissible value, by the ribs 9 which project radially on it in uniform angular distance from its exterior periphery. These guide ribs 9 have in the position coaxial to the outlet opening 2, a preset distance a of their front or radially outer faces to the inner surface of the socket 10. Their end regions are rounded off. Such a rounding off is particularly advantageous in the lower end area as this is constructed as a stop and striking member. The lowering movement of the casing 8 is in fact ended in the position II in that this lower end area of the guide ribs 9 abuts a stop surface 15 on the flange 1 of the container, to be filled, above the sealing seat 3.

This stop surface 15 is curved so as to have a torus shape so that the casing has every degree of freedom to adjust itself with respect to this stop surface 15 to such an extent that its guide distance a between each of the guide ribs 9, nearest the socket, is permitted. In order to support the possibilities for such a tipping equalization movement the upper end area of the guide ribs is also rounded off. This rounding off also serves moreover to make it possible for particles of the charge which have got into the chamber above the guide ribs 9 to slide down as well.

To exclude formation of a bridge by charge particles at the underside of the casing 8 to as wide an extent as possible, the casing has on its lower front face a chamfer 17 which widens upwards. Furthermore as can be seen clearly from FIG. 2, the lower end area of the inner chamber of the casing 8 widens downwards and in fact by means of a conical chamfer 18. The edge at which the opposing chamfers 14 and 17 would intersect is deliberately rounded off.

The actuating mechanism for a sealing element is held so as to stand away downwards from the flange 1 by way of several, preferably three spacer bolts 21 (FIG. 4) and the sealing element can be brought into abutment with a sealing surface at the sealing seat 3. It is basically immaterial in the invention whether or not the actuation of the sealing element is effected manually or with the help of pneumatic, hydraulic or electric actuating energy or directly or by remote control. In the embodiment shown, a cylinder 20 is operated which is supported so as to be secured to the top wall by way of a support cap 22, which is carried by the spacer bolts 21. The feed and discharge lines for its pneumatic or hydraulic actuation energy are laid in the spacer bolts 21, as can be seen from FIG. 4.

The upper free end of the piston rod 19 of this hydraulic or pneumatic cylinder 20 carries by way of a single-point suspension the sealing element 4, 5. This is composed in the embodiment shown of two parts, namely a lower part, near to the piston rod and having the shape of a spherical segment which is a pressed or cold rolled part 4 of steel and a conical hood part 5, which overlaps its culmination area and whose lower peripheral area passes over tangentially into the sperical-segment part 4. The sealing element 4, 5 composed of these two parts 4 and 5 in accordance with the invention offers to each of the other sealing elements a sealing surface having the shape of a spherical segment, both in the area in which it comes into sealing effect, in the course of the closing movement, with the sealing ring, forming the sealing seat, as well as in the area in which the casing 8 rests on it. It can be seen that the arrangement is done in such a manner that the sealing element 4, 5 projects into the inner chamber of the loading funnel 12 by at least its conical area, while the latter again projects into the chamber between the shut-off device 4, 5 and the casing 8.

The single-point suspension of the sealing element 4, 5 is constructed in such a manner that the sealing element 4, 5 rests on a spherical segment or dome-tipped fillister head, bolted to the free end of the piston rod 19 of the hydraulic or pneumatic cylinder 20 and is fixed to the piston rod 19 by way of a retaining nut which is bolted to a socket, secured to the sealing element, which has an external thread and overlaps the head. Between the shaft of the carrier head for the sealing element 4, 5 which is seated on the piston rod 19 and whose spherical-segmment or dome-tipped fillister head has a smaller diameter than the spherical segment part 4 of the sealing element 4, 5, and the threaded pipe, secured to the sealing element, a spring element is disposed which is constructed as a flexible ring. In this manner by extremely simple and cheap means, which thus require in particular very little maintenance, the sealing element 4, 5 is given the possibility, if this should be necessary, of placing itself by its own means in an equalization position, in which its axis is no longer disposed coaxially to the piston rod axis b but is inclined at an angle to it. This single-point suspension 5A, whose individual parts are shown in FIG. 1, but have however no reference numbers, gives the sealing element 4, 5 therefore a degree of freedom for a tipping or tumbling movement about the piston rod axis b. The spring element, constructed as a flexible ring, thereby also serves further to compensate for some degree of thermal expansion in operation, which, for example, may occur due to the high temperature of the discharged material. A possibility is provided for taking such thermal expansion into account, which fixes the permissible tipping force, i.e. the force which is still sufficient to provide the sealing element 4, 5 with such a tipping or tumbling movement, by means of adjusting the pretensioning of the spring element. For this purpose one or several pretensioning screws with lock nuts are provided which press on the lower end of the threaded pipe, secured to the sealing element, and by way thereof onto the spring element. FIG. 1 shows such a screw with a lock nut. The threaded pipe may have in its lower area, remote from the sealing element, several slots so that they can be pressed in for the purposes of applying great pressure to the spring element.

Figure 2:
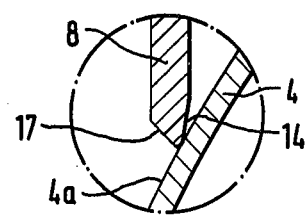
FIG. 2 a detail in the area of the support of the casing on the sealing surface of the sealing element on an enlarged scale.

FIG. 1 shows the sealing element 4, 5 in its fully closed position, where the casing 8 rests in the manner shown, details of which can be seen particularly well in FIG. 2, on the lower area 4 of the sealing element, which has the shape of a spherical segment. By this means the maximum floor pressure surface is limited, which the charge to be inserted in the container to be filled, can occupy. The charge is slid by way of the funnel 12 and its outlet mouth onto the sealing surface 4a of the sealing element 4, 5 and its and the particles can flow out of the funnel mouth and according to their angle of pouring support themselves against the inner surface of the casing 8. In so doing it happens that the floor pressure surface is formed by the line of contact between the area 4, having the shape of a spherical segment, of the sealing element 4, 5 andthe lower setdown area of the casing 8. The smallest cross-section of passage between the sealing surface 4a of the sealing element 4, 5 and the outlet mouth of the funnel 12 is located at the end of this outlet mouth.

If the opening operation of the sealing element is now introduced then the sealing element 4, 5 moves due to actuation of the cylinder 20 in the direction of the arrow which points downwards. In so doing the linear pressure sealing connection between the lower peripheral area 4 of the sealing element 4, 5 and the sealing seat is cancelled. Due to the shaping of the external surface of the sealing element 4, 5 the space between this surface and the sealing seat 3 thus becomes increasingly larger during the course of the lowering movement (opening movement). This however has no effect on the charge flow. In fact the casing 8 remains at rest on the sealing surface 4a of the sealing element 4, 5 unaltered. It only alters its height level from the closing position designated by I to a lower position and in so doing the sealing action for the charge is retained. On the other hand, however, the free cross-section of passage for the charge is enlarged. Thus the lower area of the charge column, which is kept between the outlet mouth of the funnel 12 and the sealing surface 4a of the sealing element 4, 5 is constantly enlarged and the discharged material in this area is loosened. By this means in every case a bridge formation of the charge between the funnel 12 and the sealing element 4, 5 is automatically excluded by the opening procedure. In the case that the supply of charge to the container takes place directly from a reserve container, connected to its input, and the air in the container, which is to be loaded, is under excess pressure with respect to ambient pressure, it may be desirable to utilize this air under excess pressure to increase further the loosening effect for the charge. In fact in the state, previously described, the pressure sealing between the lower peripheral area 4 of the sealing element 4, 5 and the sealing seat 3 is cancelled so that a free cross-section of passage is there presented for the gaseous filling medium of the container to be loaded. The medium can thus flow upwards into the chamber 16 above the sealing seat 3 and along the outer surface of the casing 8 and between its support ribs 9 and pass by way of the upper edge of the casing 8 into the chamber 13 between the casing and the funnel 12. It is now presented with a free cross-section of passage which widens constantly during the course of the opening movement of the sealing element. As moreover the cross-section of passage in the area of the pressure sealing constantly widens at the same time, this gaseous medium which is under pressure can be fed to an increasing extent and then leads to a loosening of the charge column without the charge already being able to escape from the chamber 13 between the casing 8 and the sealing element 4,5, the chamber constantly lowering its position further.

During the course of this lowering movement the casing 8 is displaced from inside at a distance beyond the sealing seat 3 in the manner of a curtain or apron. This lowering movement of the casing 8 takes place for such a length of time until it has reached its protecting position designated by II. This is the case where the lower rounded-off area of the guide rib abuts the upper likewise rounded-off area 15 of the top wall 1 of the container to be loaded, above the sealing seat 3. By this means, on the one hand, the lowering movement of the casing 8 is limited while the sealing element 4,5 continues its lowering movement. Thus the sealing connection between the casing 8 and the sealing surface 4a of the sealing element is now cancelled and the charge begins to flow through the free cross-section, which thus forms and which moreover widens constantly at the same time due to the shaping of the sealing surface 4a of the sealing element during the course of its lowering movement. In so doing, however, in the embodiment shown the highest area of the cross-section of downflow for the charge is located below the height level of the sealing seat 3 which itself is protected from contact with the charge by the casing 8. In the case of certain charges the protecting position II of the casing 8 does not need to be provided so low and it may even on the contrary have a height level above the sealing seat 3 provided one ensures that the charge on account of the properties of its angle of pouring or of flow cannot reach the sealing seat 3, but on the contrary always flows past it without coming into contact with it. Such an arrangement is, however, only recommended when the charge has a normal temperature. The preferred embodiment shown in FIG. 1, by contrast, also protects moreover against the thermal action of the charge on the sealing seat 3.

On the other hand a stop pulse results automatically during the course of the opening movement at that moment when the lower area of the guide ribs 9 of the casing 8 abuts the surface 15 which is constructed as a stop rim and at the same tip is rounded off on all sides, above the sealing seat 3 of the top wall 1 of the container to be filled. By this means the area of the top wall 1, near to the sealing seat is shaken and this causes any deposits on this surface to flow down automatically into the annular clearance, long since free, between the sealing seat and the lower peripheral area 4 of the sealing element 4, 5, and, on the other hand, that of the casing 8 and, where necessary, with a corresponding coordination of the movement cycle to the geometry, by means of transmission of the lower annular front faces of the casing onto the sealing element 4, 5 and well, whereby any compression or bridge formation of the lower area of the charge column is at the same time automatically is smashed or shaken to pieces and thus a secure commencement of the downflow procedure, which always takes place at the same place, is reliably ensured.

FIG. 2 shows the maximum lowered position of the sealing element 4,5. Until it reaches this position the charge has sufficient room to flow down through the annular clearance which opens on the one hand between the sealing surface 4a of the sealing element 4,5 and on the other hand the lower edge of the casing 8, located in the protecting position II. By such means one always ensures that this charge flow goes past the sealing seat 3 without coming into contact with it. An annular cross-section of passage is, however, thereby always free between the outer surface of the casing 8 and the inner front edge of the inlet opening 2. Through it, should this be considered necessary, can flow a gaseous medium contained in the container to be loaded during the course of its displacement by the charge inserted in the container. This medium can, in the manner which has already been described, and flowing about the upper edge of the casing 8, force its way, itself, through the downflow mouth of the funnel 12 and the charge which flows in by way of this mouth in order to pass into the interior of a reserve container, connected directly to the input, from where the container to be filled is directly loaded with a charge. On the other, however, it can also be discharged, in that, as shown in FIG. 1, a connecting pipe 24 for a discharge pipe opens into the buffer chamber 16 between the outer surface of the casing 8 and the inner surface of the socket 10. The gaseous charge chamber medium can be discharged through this pipe and, by way of one or several branch pipes, which open into the upper area of the wall of the reserve chamber, can be used therein as a filling medium for the level of discharged material which is lowered, or however, this charge chamber medium can be discharged by way of this pipe for a different purpose, for example, cleaning, filtering, drying, compression or the like, in order to make its recycling possible. In so doing it is immaterial whether the charge chamber medium is under normal, i.e. ambient pressure or however, excess pressure with respect to ambient pressure. As by means of the concept in accordance with the invention the pressure sealing between the lower peripheral area 4 of the sealing element 4,5 and the sealing seat 3 is open to the flow long before the release of the down flow or inflow procedure of the charge, the sealing device in accordance with the invention is also suitable, for the first time, to undertake a relaxation of pressure in the container to be loaded before the actual insertion of the charge commences. Such a pressure relaxation or displacement current can thereby also be continued during the insertion of the charge in the container. The invention relates for the first time to a genuine dual flow blocking element having two currents which occur in counter-flow, namely the charge current into the container to be filled as one and as the other the current of gaseous medium through the area, open to the flow, of the cross-section of passage above the charge flow. To influence the gaseous counter-current into the buffer chamber 16 and from there into the discharge pipe 24, for example, with respect to its temporal cycle, a throttle valve of known embodiment, which is not shown, can be disposed at a suitable place in the discharge pipe 24 and it can be moreover actuated by manual, pneumatic, hydraulic or electric means and can even be remotely controlled.

In order to close the sealing device in accordance with the invention, the actuating cyclinder is fed in an opposite direction with hydraulic or pneumatic pressure means so that the piston rod 19 extends and the sealing element 4,5 borne at its tip executes a raising movement, in the course of which its sealing surface 4a in its area 4, having the shape of a spherical segment, moves to the height level of the protecting position II of the casing 8. During the closing movement the sealing element thereby forces its way with its conical area 5 through the charge flow in the manner of a ram rod. When it abuts the under edge of the casing 8 in the protecting position II a loosening pulse is again applied on the one hand to the sealing element 4,5 and on the other to the casing 8. And this loosening pulse which always occurs in the same place in an automatic and reproducable manner, serves in accordance with the object of the invention, for the purposes of loosening the particles of charge which remain sticking to the area of the sealing surface 4a of the sealing element 4,5, located below the under edge of the casing 8, in such a manner they flow away in this area or fall freely downwards through the still exposed annular cross-section between this sealing surface and the sealing seat 3. A kind of self-cleaning action of the sealing surface 4a thus occurs in its lower peripheral area 4, which serves later for the pressure sealing. This action is further supported by the construction of the inner and outer peripheral contours of the casing 8. As can be seen particularly well in FIG. 2, room is exposed by the chamfer 17 of the lower front area of the casing 8, which widens outward, in which room during the abutment of the sealing surface 4a on the casing 8 or shortly before it particles of the charge are blown into the buffer chamber 16 and can fall downwards out of it to fall freely through the annular cross-section, already described. The other inner chamfer 14 present serves the purpose of automatically clearing the contact area between the casing 8 and the sealing surface 4a of the sealing element 4,5 of particles of the charge. Shortly before the abutment of the sealing surface 4a on the under edge of the casing 8 the particles of charge which are in fact located in the space between the chamfer 14 and the sealing surface 4a are automatically deflected upwards by the continuation of the closing movement of the sealing element 4,5, depending on the grain size somewhat earlier or later, in every case, however, before the final sealing closure. Also in this respect such a self-cleaning action occurs here, which in every case keeps the abutment area of the casing 8 and the sealing element 4,5 virtually free of the charge. For the case that particles of the charge should not be able to to be blown upwards, for example because of unfavorable grain size or configuration, the rounding-off of the edge formed between the two chamfers 17 and 14 is provided. In such a case this supports the already described adjustment capabilities of the sealing element 4,5 and the casing 8 in order to achieve a sealing action which is tight with respect to the charge.

Now in the continuation of the closing movement the charge column, enclosed between the sealing surface 4a of the sealing element 4,5 and the casing 8, is lifted up, whereby the casing 8 surrounding the column follows the raising movement. Towards the end of the closing movement, the lower peripheral area of the sealing surface 4a of the sealing element 4,5, which has the shape of a spherical segment, then approaches the sealing seat 3. At this moment as well, a self-cleaning action, provided in accordance with the invention, operates in that particles of the charge which are in fact above the sealing seat on the cambered surface 15 of the inlet opening 2 as well as those which have remained above the pressure sealing zone on the sealing surface 4a of the seling element 4,5 are likewise blown into the space between the inlet opening wall and the sealing element, which opens so as to widen upwards. At the same time the chamfer 18 in the flange 1 below the sealing seat 3, which forms a space 7 which opens so as to widen downwards, between the flange 1 and the lower peripheral area of the sealing surface 4a of the sealing element 4,5, presents the possibility that now during the course of the last movement phase, particles of the charge which are still on this outermost peripheral area of the sealing surface 4a cannot press themselves and impress themselves onto the material of the sealing seat 3 with the closing movement but prior to the final closure of the pressure sealing connection are automatically blown downwards into the interior of the container to be loaded.

Figure 3:
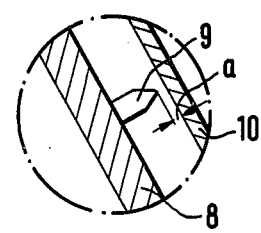
FIG. 3 a detail on a likewise enlarged scale of a detail of a horizontal partial section through a buffer chamber mounted above the sealing seat, with its lateral limitations by the casing with the guide rib on the one side and the socket on the other, whereby for the sake of simplifying the drawing the guide casing and socket are shown in rectilineal projection.

It can be seen that the self-cleaning action in accordance with the invention concept reciprocates with the different measures in accordance with the invention for constant equalization possibilities of the relative position to each other of the components effecting the two sealing actions, namely on the one hand the charge sealing and on the other the pressure sealing. Care is thereby taken in every respect in accordance with the invention to ensure the linear contact of the components which produce these sealing actions. Particularly low-wear equalization possibilities thereby result in the embodiment shown from rounding off each of the contact edges which is set on a surface. With the same aim of supporting the self-cleaning action and the self-adjusting possibilities, as can be seen in FIG. 3, the guide ribs 9 of the casing 8 are given a pointed shape on both sides. This pointed shape on both sides or chamfer as well as the rounding off of the edge between these two pointed surfaces of the guide ribs (see FIG. 3) serves the purpose of self-cleaning action, i.e. the greatest possible avoidance of particles of charge becoming wedged between the front face of the guide ribs 9 and the socket 10, which could disturb tipping and tumbling movements as equalization movements as well as the up and down movements of the casing 8.

Figure 4:
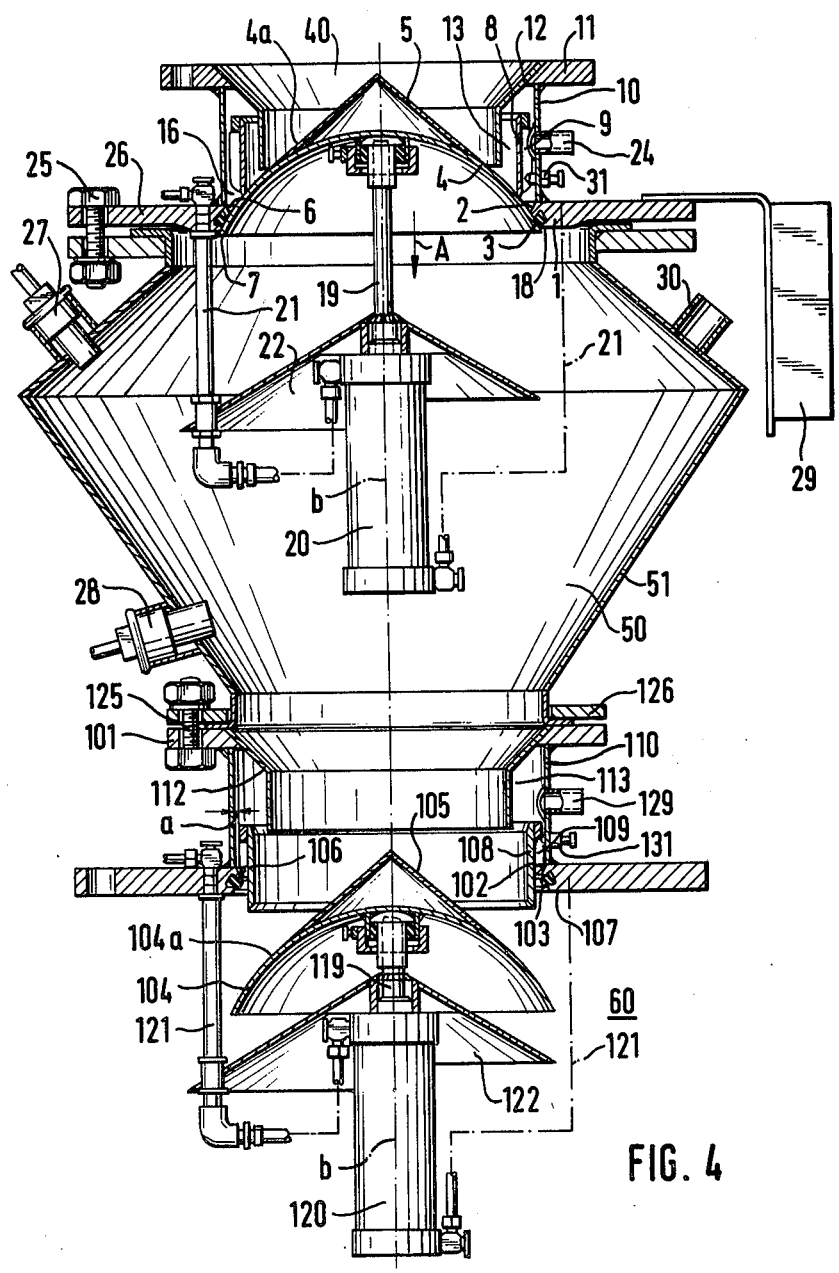
FIG. 4 two sealing devices in a diagrammatic representation connected one behind the other and FIGS. 5 and 6 a sluicing device constructed with the sealing device in accordance with the invention.

FIG. 4 describes an example of use for the operation of two sealing device in accordance with the invention.

The two sealing device are disposed one above the other, whereby the same parts are provided with the same reference numbers. In the case of the sealing device at the bottom the reference numbers for the same parts have been increased by 100.

The device shown in FIG. 4 serves to feed a filling material of the kind hitherto described from one receiving chamber 40 to another receiving chamber in which different pressure relationship or a different composition of the air in comparison to the first receiving chamber might prevail. To this end a sealing device in accordance with the invention is attached to the outlet opening of the receiving chamber 40 as well as to the inlet opening of the second chamber and the two devices are connected to each other by a sluicing chamber 50. The connection of the sluicing chamber 50 to the sealing devices is effected by means of flanges 26 and 126 which are bolted to the flanges 1 and 101 of the sealing devices in accordance with the invention by means of the screws 25 and 125.

The sluicing chamber 50 has two level measuring devices 27 and 28 which operate advantageously on a capacitive basic and measure the filling of the sluicing chamber. The sluicing chamber 50 has further a connecting pipe 30 for which the connection is always closed by one of the sealing devices. This thus ensures that the air in the two receiving chambers always remains separated. The method of operation of this column-shaped device is described in conjunctions with FIGS. 5 and 6 in which two devices of this kind are connected in parallel.

Figure 5:
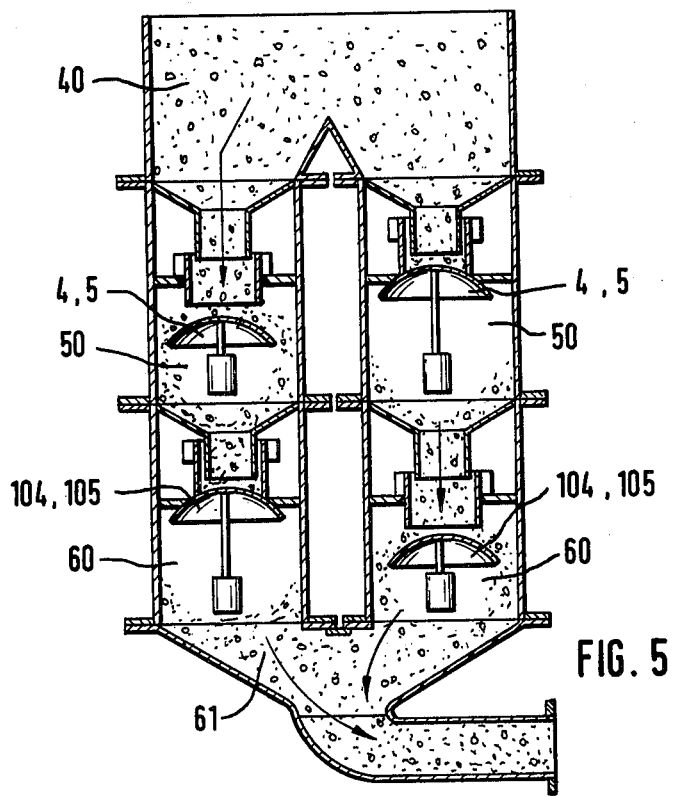
Figure 6:
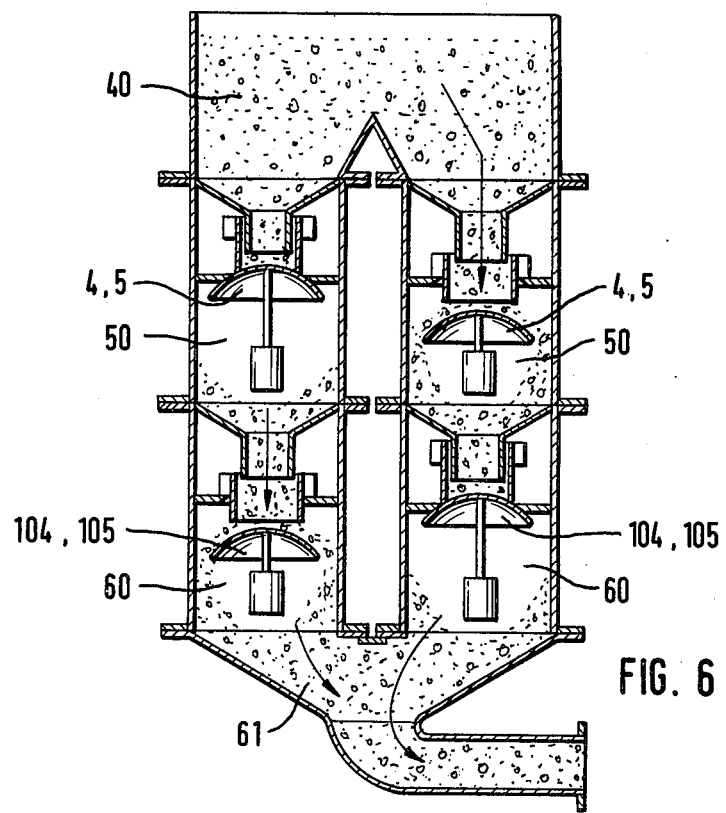

FIGS. 5 and 6 shows diagrammatically the operating scheme of a different preferred embodiment of the invention for the continual sluicing of the filling from one receiving chamber 40 to the other receiving chamber 60 by way of two sluicing chambers 50 which are disposed parallel to each other and operate with respect to each other with a temporal phase displacement. The four sealing elements for the two inlet and outlet openings of the two sluicing chambers cooperate with each of the associated shell-shaped separation elements and with each of the associated sealing seats in the same manner as has already been described. As can be seen the sealing elements only have the shape of a spherical segment over their entire sealing surface. This can be of advantage for a certain loose material, while on the other hand in the case of other filling materials one may recommend selecting other shapes for the sealing elements as has also already been described hitherto.

The device in accordance with the embodiment according to FIGS. 3 and 4 may preferably be operated as a feed unit for a conveyer system for fluid loose material or the like, which, for example, operates, pneumatically, and then takes over the function of a conveyor unit for this system. It operates in accordance with the embodiment shown on the four stroke principle. These strokes pass smoothly one into the other and thus create a continuous production flow.

The first stroke is concerned with filling. The product or filling material which comes continuously from, for example, a silo bunker or the like is slid through the inlet opening of one of the two sluicing chambers, for example, by means of gravity, into the conveyor unit, whereby mutual control ensures that one of the two inlets openings is always closed when the other is open to the flow.

The second stroke is concerned with the sluicing. This occurs in the conveyor pressure area, i.e. in the area of the pressure which prevails in the receiving chamber disposed after the sluicing chamber and in each case with the inlet opening closed. The sluicing of the filling material located in the relevant sluicing chamber, into the receiving chamber, disposed thereafter, can take place advantageously in that the product or filling material located in the closed sluicing chamber is at once filled up with compressed air and with increasing pressure flows into the receiving chamber, disposed thereafter, after the outlet opening of the relevant sluicing chamber has been opened. Here too a corresponding mutual control ensures that the outlet opening of one sluicing chamber is always closed when the outlet opening of the other sluicing chamber is open to the flow.

The third stroke is concerned with the pressure. After in fact the outlet opening of the sluicing chamber for the filling material, which is to be emptied into the receiving chamber, disposed thereafter, has been opened, the contents of this sluicing chamber, which have already been filled up with pressure must be given sufficient time in order for them to flow out into this receiving chamber which is disposed thereafter and which serves as a feed trough and to fill it.

In the case of the fourth stroke, concerned with the conveying, the product or filling material is continuously fed from the feed trough which is filled in strokes through the inlet openings, which are selectively closed, into the supply line and thus the feeding is introduced. As the supply of product takes place continuously the supply of conveyor air to the feed trough can also be constant and does not require any particular control unit. It is solely the stroke control unit for the actuation of the sealing elements of the inlet and outlet openings of the two sluicing chambers which is required. It can be adjusted so as to be adapted to the output requirements in each case and preferably so in that an adjustable timing relay is provided as a pacemaker.

For many uses an automatic control of the cycle of the sluicing, in accordance with the invention, of the filling material is desirable. For this purpose in accordance with a further inventive development one can provide that the insertion of the filling material into the sluicing chamber and/or into the receiving chamber, connected thereafter, is undertaken in dependence upon the degree of filling of the sluicing chamber. On the other hand the insertion of filling material into a sluicing chamber can also be introduced advantageously in dependence upon the fact that the falling level of filling material due to its removal from the sluicing chamber has reached a predetermined height value. The same is also true for the removal of filling material from a sluicing chamber, which can be introduced in dependence upon the fact that the rising level of filling due to its filling the sluicing chamber has reached a predetermined height value. The automatic control is thus made dependent on the level of filling material in the relevant sluicing chamber in each case.

In each case in accordance with a further development of the invention care is taken that the insertion of filling material into one sluicing chamber is introduced in dependence upon that fact that the sealing element of its outlet opening is located in a sealing position, while on the other hand the introduction of the removal of filling material from a sluicing chamber occurs in dependence upon the fact that the sealing element of its inlet opening is located in a pressure sealing position.

For this purpose a locking device can advantageously be provided by means of which the actuation of one or other of the sealing elements can be kept blocked until the arrival of an actuating pulse to indicate that the relevant sealing element is located in a pressure sealing position.

The actuation of the hydraulic or pneumatic cylinder 20 of the sealing element 4,5 for the inlet opening 2 can in the embodiment shown be effected preferably in dependence on a preprogrammed time sequence. For this purpose a program feeding device 29 is provided which can be disposed at any place as desired, preferably, however, as in the embodiment according to FIG. 4, it is carried by the component for sealing the inlet opening 2 and can thus be separated for maintainance, readjustment etc, by this component from the device as a whole. This program feeding device 29 has, for example, a pacemaker, which is not shown in greater detail, in the form of an adjustable timing relay, by means of which the step number can be preset dependent upon the output requirements. In dependence upon this pacemaker the inlet opening thus opens and closes and the level in the sluicing chamber 50 thus rises when there is no call for filling material by means of the outlet opening 102. As can be seen from FIG. 1 two level measuring devices are kept in its wall at different height levels and preferably operate capacitatively, of which the lower device bears the designation 28 and the upper 27. These level measuring devices are connected according to their signal pulses to the program feeding device 29. As soon as the filling material, which has passed through the inlet opening 2 into the interior of the sluicing chamber, has reached the level of the level measuring device 29, a blocking pulse, which has been effective till then, for the actuation of the hydraulic or pneumatic cylinder 120 of the sealing elements 104, 105 of the outlet opening 102, is cancelled. The hydraulic or pneumatic cylinder 120 can thus now be actuated to open the sealing elements 104, 105 for the outlet opening 102 and this is done in order to effect a genuine open control in accordance with individual wishes of an operator or as a half-open cycle in dependence upon a likewise preprogrammed time sequence. An actual program control device with a pacemaker can also be provided for this cylinder 120. There are thus a multitude of operating possibilities for such a device in accordance with the invention.

The embodiment of the invention in which an exclusive property or privilege is claimed are defined as follows:

1. In a sealing device for an opening in the wall of a container which is loaded with or emptied of a charge of fluid loose material, viscous deposits, sludges or the like and which after the loading or the emptying is sealed tightly, said sealing device having a movably supported sealing element which can be brought into sealing abutment with a sealing seat, secured to the wall, by means of its sealing surface, the improvement comprising wherein said sealing element has a sealing surface which can be brought into linear sealing abutment with said sealing seat, above this line of sealing abutment a freely movable casing having a diameter smaller than that of the sealing abutment line is supported on said sealing surface of said sealing element during the first part of the opening operation until said line of sealing abutment is positioned below said sealing seat and is free of engagement therewith in the following movement of said sealing element and wherein a material guide device is provided for said charge, by means of which it can be guided onto the area of said sealing element enclosed by said casing resting on said sealing surface of said sealing element and on a side of said casing remote from said sealing seat to thereby protect said sealing seat from engagement with said material during the opening and closing movement of said sealing element.

2. A sealing device in accordance with claim 1, wherein said sealing element is constructed so that the free cross-section of passage for said charge and the container air constantly widens during the course of its opening movement.

3. A sealing device in accordance with claim 1, wherein said guide device is constructed as a funnel and wherein at least a part of said sealing element projects into the funnel interior in its fully closed position.

4. A sealing device in accordance with claim 3, wherein said casing is cylindrical and wherein said funnel projects into the central part of said casing when said sealing element is in its fully closed position.

5. A sealing device in accordance with claim 1, wherein said sealing element is constructed as at least one of a truncated cone, a cone, a spherical segment and a truncated cone having a culmination area which is rounded off to the approximate shape of a sphere.

6. A sealing device in accordance with claim 1, wherein said sealing element has a sealing surface having the shape of a spherical segment.

7. A sealing device in accordance with claim 1, wherein said sealing element has a sealing surface composed of a conical culmination area and an area having the shape of a spherical segment and connected to it toward the outside.

8. A sealing device in accordance with claim 1, wherein said casing is kept in abutment on said sealing surface of said sealing element by means of the effect of gravity.

9. A sealing device in accordance with claim 1, wherein said casing is displaced between a closing position (I) and a protecting position (II).

10. A sealing device in accordance with claim 9, wherein in the protecting position (II) the casing protects said sealing seat from said charge.

11. A sealing device in accordance with claim 1, wherein said causing is guided along the side of said wall for the raising and lowering movement.

12. A sealing device in accordance with claim 11, wherein said casing during its movement, which follows the raising and lowering movement of said sealing element, is guided with a degree of freedom to enable a tipping or tumbling movement at a slight angle of inclination to the direction of movement (A) of said sealing element.

13. A sealing device in accordance with claim 12, wherein said casing has distributed radially at uniform angular distances about its outer surface guide ribs which project therefrom and whose front faces are guided along the inner wall of a socket, secured to a top wall, for axial movement.

14. A sealing device in accordance with claim 13, wherein a movement equalization clearance (a) is provided for said casing between the front faces of said guide ribs and said socket.

15. A sealing device in accordance with claim 13, wherein said casing has in its lower peripheral area in inner diameter which widens outwards.

16. A sealing device in accordance with claim 15, wherein the expanded part of said inner diameter of said casing is constructed in the shape of a cone.

17. A sealing device in accordance with claim 16, wherein said casing has on its lower front face a rounded off cross-section.

18. A sealing device in accordance with claim 13, wherein said guide ribs are constructed as stop cams which abut a stop surface of said top wall.

19. A sealing device in accordance with claim 1, wherein during the course of the opening and closing movement of said sealing element after it lifts away from or before it abuts said sealing seat, pulse producing means are provided for applying a loosening pulse to at least one of the accumulation of said charge between said sealing element and said casing resting thereon, said sealing element and the wall area adjacent said sealing seat.

20. A sealing device in accordance with claim 19, wherein said pulse producing means includes a striking member secured to said casing, on said wall area, adjacent said sealing seat.

21. A sealing device in accordance with claim 20, having radial guide ribs for said casing, wherein the lower ends of said guide ribs are constructed as said striking members, by means of whose impact on a rim disposed above said sealing seat and secured to said wall, said loosening pulse is applied.

22. A sealing device in accordance with claim 21, wherein said guide ribs are rounded off in their end regions.

23. A sealing device in accordance with claim 22, wherein the leading edge areas of the guide ribs taper outwards.

24. A sealing device in accordance with claim 1, wherein said casing in its lower peripheral area has a chamfer which extends outwards.

25. A sealing device in accordance with claim 1, wherein said wall above said sealing seat has a shape which presents a space which constantly widens upwards, between said wall and said sealing surface of said sealing element.

26. A sealing device in accordance with claim 25, wherein said wall above said sealing seat is shaped so as to curve away from said sealing surface of said sealing element 27. A sealing element in accordance with claim 1, including a buffer chamber above said sealing seat for parts of the charge which are deflected from the area of said sealing seat during the closing operation of said sealing element.

28. A sealing device in accordance with claim 27, wherein said casing is guided at a distance in a socket by way of guide ribs on said casing, wherein said buffer chamber is formed between said casing and said socket.

29. A sealing device in accordance with claim 1, wherein said wall below the sealing seat has a shape which presents a space, which constantly widens downwards, between said wall and said sealing surface of said sealing element.

30. A sealing device in accordance with claim 29, wherein the inclination of the wall of said space between said sealing surface of said sealing element and a top wall corresponds at the narrowest place thereof to the angle of pouring or of flow of said charge, to be inserted in the container, having the maximum angle of pouring or of flow.

31. A sealing device in accordance with claim 1, wherein said sealing seat is formed by a ring seal of an elastic material, which is kept in an inner front wall of said inlet opening.

32. A sealing device in accordance with claim 1, wherein said sealing element at least during its abutment on said sealing seat is kept with a degree of freedom for a tipping or tumbling movement about its axis of movement.

33. A sealing device in accordance with claim 1, wherein said sealing element is mounted at the end of a piston rod of at least one of a hydraulically and pneumatically actuatable cylinder which is kept in the interior of the container by way of spacer bolts which project into the container interior from the wall.

34. A sealing device in accordance with claim 33, wherein at least two of said spacer bolts are constructed as feed or discharge pipes for the hydraulic or pneumatic pressure means.

35. A sealing device in accordance with claim 1, wherein a predetermined period of time prior to the release of the free downwards sliding of said charge from said sealing surface of said sealing element by means of the cancelling of the support connection of said casing on said sealing surface, the pressure action between said sealing surface of said sealing element and said sealing seat is cancelled and in this period of time by means of the approximately annular space, still free of charge, between said sealing surface of said sealing element and said sealing seat an excess pressure in the interior of the container is relaxed and the container air is at least partially evacuated.

36. A sealing device in accordance with claim 35, having a buffer chamber above said sealing seat, wherein a venting or pressure relaxation line opens from he outside into the buffer chamber.

37. A sealing device in accordance with claim 36, wherein a throttle valve is disposed in the venting or pressure relaxation line.

38. A device to feed a filling material from a first receiving chamber to a second receiving chamber, which are connected to each other in a pressure-tight manner by way of a sluicing chamber and whose outlet or inlet openings are each sealable by a sealing device, wherein said sealing devices are in accordance with claim 1.

39. A device in accordance with claim 38, wherein said first receiving chamber is connected to said second receiving chamber by way of two sluicing chambers disposed in parallel, which are each connected to said first and second receiving chambers by way of a sealing device.

40. A device in accordance with claim 39, wherein said sealing devices are forcibly or automatically controlled.

41. A device in accordance with claim 38, wherein the filling material is inserted in said sluicing chamber under the effect of gravity.

42. A device in accordance with claim 38, wherein said filling material is brought out of said sluicing chamber into the receiving chamber connected thereafter, under the effect of a high pressure which can be built up above the level of filling material in said sluicing chamber.

43. A device in accordance with claim 38, wherein the filling or emptying of said sluicing chamber is effected in dependence upon the degree of filling of said sluicing chamber.

* * * * *